April 30, 1957  E. WILDHABER  2,790,334
GEARLESS DIFFERENTIAL
Filed Oct. 12, 1953  4 Sheets-Sheet 1

INVENTOR:
E. WILDHABER
BY
Attorney

April 30, 1957  E. WILDHABER  2,790,334
GEARLESS DIFFERENTIAL
Filed Oct. 12, 1953  4 Sheets-Sheet 4

INVENTOR:
ERNEST WILDHABER
BY
[signature]
Attorney

United States Patent Office 2,790,334
Patented Apr. 30, 1957

2,790,334

GEARLESS DIFFERENTIAL

Ernest Wildhaber, Rochester, N. Y.

Application October 12, 1953, Serial No. 385,573

17 Claims. (Cl. 74—650)

The present invention relates to differentials and more particularly to differentials for use on automotive vehicles such as passenger automobiles, buses, trucks, tractors, and the like. In a more specific aspect the invention relates to gearless differentials or torque dividers.

The usual automotive differential is a gear-type differential. Here, the driving torque is transmitted to two driving axles of the vehicle through a spider and planetary gearing, spur or bevel, including side gears that are secured to the two axles. When the automotive vehicle is proceeding in a straight line direction, the side gears of the differential are fixed relative to one another and no differentiation takes place between the two axles; but for turning a corner differential action is effected, and the side gear which is connected to the outside wheel can revolve at a faster rate than the side gear connected to the inside wheel. If one wheel loses traction, though, and spins, the driving power will be diverted to that wheel, and the power effected to propel the vehicle will be proportionate to the traction of this slipping wheel only. In many instances it occurs that this effective propelling force is insufficient to move the vehicle with the result that the driving motion all goes to the slipping wheel and the power is there dissipated.

Differentials have been devised which are partially or wholly locking. Such differentials are intended to prevent wheel slippage and to insure that sufficient power will be transmitted to both driving wheels of an axle to drive the car off the ice or out of the mud that is causing the wheel slippage. Locking gear-type differentials are usually either inefficient, complicated or expensive as compared with a conventional gear-type differential and are not extensively used.

Some differentials have been built which are gearless and self-locking. These usually employ internal and external cams and cooperating sliding members. Gearless differentials are known, for instance, which contain two coaxial cam members and a cage member coaxial therewith, with the sliding parts held in the cage member and engaging both cam members. Here, the cage member is rigid with the rotary differential housing and receives the whole power transmitted through the differential. The two cam members receive the divided power.

Known cam type differentials require very large inclinations of the cam profiles to the radial direction to obtain a sufficient locking action in the differential. This results in large loads which extend generally perpendicular to the cam profile. The large radial components of these loads tend to deform especially the internal cam member and produce bulges therein which move around the cam.

One object of the present invention is to provide a differential having structural simplicity, strength, light weight, and low cost.

Another object of the invention is to provide a differential which will be compact and which will be of minimum axial length.

Another object of the invention is to provide a differential which will have ample capacity yet be of smaller dimension than a conventional differential.

Another object of the invention is to provide a simple and novel differential which will exert a driving effort on that wheel that has traction as well as on the wheel without traction by restricting the spinning movements of the latter wheel.

Another object of the invention is to provide a simple differential which develops enough internal friction upon differentiation that wheel spinning is practically eliminated.

Another object of the invention is to provide a novel differential driving mechanism that will exert a driving effort on each of the two vehicle wheels during each revolution of the driving element, and which consists of a few rugged parts, simply made, and capable of withstanding long, rough, usage without serious wear.

Another object of the invention is to provide an improved gearless differential having two cam members, a cage, and radially slidable parts mounted in said cage and engaging said cam members, in which power is applied to one of said cam members while the other cam member and the cage are connected with the driven road wheels of the vehicle.

Another object of the invention is to provide a gearless differential having improved working surfaces on the radially sliding parts of the differential, and on the cam members engaged thereby.

Other related objects of the invention are to provide a gearless differential in which very intimate contact may be attained between said parts and the cam surfaces to insure relatively low surface stresses and to effect maximum duration of contact between the mating profiles of the cams and the sliding parts.

A further related object of the invention is to provide a gearless differential in which improved contact is attained between the sliding parts and the cam surfaces by profile shapes which cause the radially sliding parts to move at a non-uniform rate when the cams turn at uniform rates.

Another object of the invention is to devise a gearless, cam-type differential which does not require excessive inclination of the cam profiles to attain sufficient locking action, and a differential in which the internal cam member is much less subject to being pressed out of shape radially in operation.

Another object of the invention is to provide a gearless differential in which the axle drive gear is formed integral with the internal toothed cam member of the differential and in which this internal cam member is open at both ends, whereby the bearing, which mounts the drive gear, may be secured to the drive gear by a connection which transmits practically no torque.

Another object of the invention is to provide a relatively compact differential which may be driven by a hypoid pinion and gear and in which the hypoid drive pinion is very rigidly held in a compact space without requiring an excessive shaft offset. To this end, it is a further object of the invention to provide a hypoid-driven differential which permits rigidly mounting the hypoid drive pinion in two spaced bearings disposed at opposite sides of the axis of the hypoid drive gear, while mounting the differential on two spaced bearings disposed at the same side of the axis of the hypoid drive pinion but on opposite sides of the gear.

Other objects of the invention will be apparent hereinafter from the specification and from the recital of the appended claims.

The differential of the present invention differs from known gearless differentials in that one of the two cam members is rigid with the rotary differential housing and receives the whole power transmitted through the differential. The other cam member and the cage member receive the divided power. In the differential of the present invention, the two cams contact with the sliding parts at opposite sides of the cam lobes. In known cam-type differentials, the contact with the cam lobes is at the same side. Preferably an internal and an external cam member are used, with more lobes on the internal cam member than on the external cam member.

Referring now to the drawings by numerals of reference, and first to the embodiment of the invention shown in Figs. 1 to 11 inclusive, 20 (Fig. 9) denotes the axle drive gear which is here formed integral with an internal cam member 21. The power transmitted by the drive gear to the rear axle is divided between an external cam member 23 and a cage member 24. These have, respectively, rigid, splined connection with the axle shafts 25 and 26. These shafts may be the axle shafts of a pair of driven front wheels or of a pair of driven rear wheels of an automotive vehicle. While this is so assumed in the illustrated examples, the differential can also act as a torque divider between driven front wheels and driven rear wheels, or between two pairs of driven rear wheels, and for other cases.

The cage 24 is provided with a plurality of equiangularly spaced openings 30 (Fig. 1) which extend through the cage radially and which have parallel plane sides 31. In each of these holes 30 there is mounted a part 32 which has sliding radial motion therein. The parts 32, which are sliding blocks, having parallel plane side surfaces 33, which bear against the side walls 31 of the cage openings 30.

Figure 1:
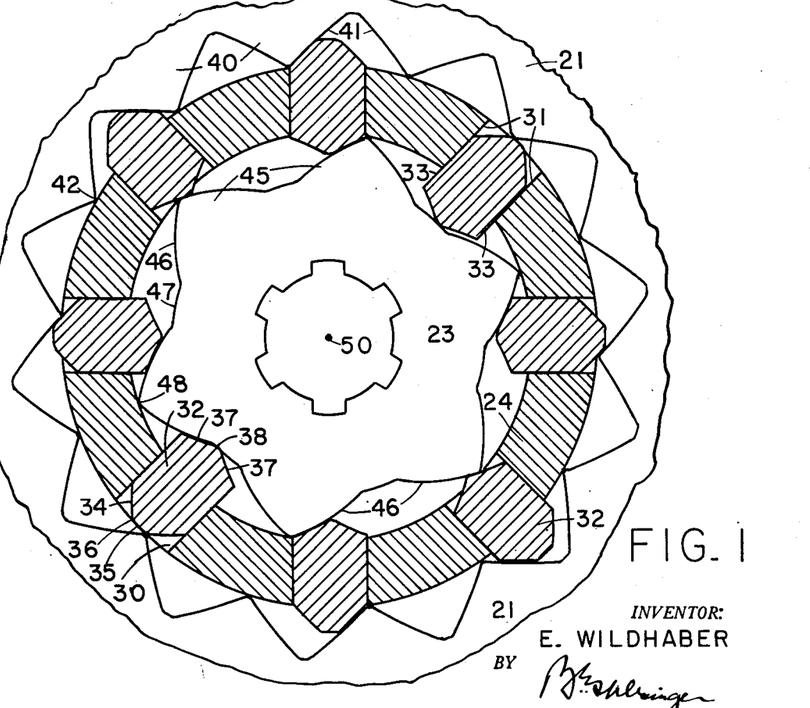
Fig. 1 is a part section, part elevational view of a differential constructed according to one embodiment of this invention, the section being taken perpendicular to the axis of the differential, and the view portion being along this axis.

At its radially outside end each part 32 has sloping portions 34 connected by a flat end portion 35. The junctures of the flat portions 35 with the sloping side portions 33 may be rounded off as denoted at 36. At their radially inner ends the sliding parts 30 have sloped portions 37 connected by a connecting portion 38. The connecting portions 38 may be rounded.

The internal cam member 21 has a plurality of lobes or teeth 40. These lobes have concave profile portions 41 and are connected by connecting portions 42 which may be rounded. The lobe or cam profiles 41 are adapted to engage the profiles 34 and 36 of the sliding parts 30.

Similarly, the external cam member 23 has lobes 45 formed by convex main profile portions 46, bottom portions 47, and connecting portions 48 connecting adjacent profile portions 46. The portions 48 may be rounded. The cam profiles 46 engage the profiles 37 of the sliding parts 32.

The relative motion between the various parts of the differential can best be analyzed and described with reference to the cage member. In other words for descriptive purposes it will first be assumed that the cage member 24 stands still and that the other members and parts move relative thereto.

In the known cam type differentials, the two cams move oppositely with respect to the cage member, and at the same rate, if equal torques are to be transmitted to the two driven shafts at zero friction. In the differential of the present invention the two cams 21 and 23 move in the same direction with respect to the cage member 24, and the external cam 23 should move exactly twice as fast as the internal cam 21 if equal torques are to be transmitted to the two driven shafts 25 and 26 at zero friction. During this relative motion of the cams the sliding parts 32 reciprocate in the cage 24. The number of complete reciprocations of a sliding part 32 back and forth per turn of a cam member 21 or 23 is equal to the number of lobes of the respective cam member. As the external cam 23 turns twice as fast as the internal cam member 21 in the considered case, the number of lobes of external cam 23 should be half the number of lobes of the internal cam 21.

At zero friction, the cage member 24 receives no energy, as it stands still in the case assumed. The total energy would then be transmitted from the internal cam member 21 to the external cam member 23. As the latter turns twice as fast as the former, its torque is half as large. In other words, at zero friction, the external cam 23 with half the number of lobes gets half the torque of the internal cam 21. The remainder has then to be transmitted to the cage member 24. It gets also one half the total torque. Both the cage member and the external cam, therefore, receive equal torques, half of the total torque, at zero friction. This torque distribution is independent of the motion, and applies, also, when, as in the case illustrated in the drawings, the cage member moves. Thus, it is seen that equal torque is transmitted to the two driven members at zero friction, when the number of lobes of the internal and external cams is at the ratio of 2 to 1, as stated above.

Unequal torques are attainable by altering the number of lobes. Thus, if it is desired that the external cam receive one third of the total torque at zero friction, then its number of lobes should be one third of the number of lobes of the internal cam. Actually it should be less than one third because of the presence of friction. In all cases, the two cams turn at rates inversely proportional to their number of lobes.

When the two cams turn uniformly in this proportion, each sliding part 32 moves along its radial guides. The question now arises: does it move at a uniform rate upon uniform rotation of the cams? The sliding parts of the known art are intended to move at a uniform rate in the region of their middle positions, away from the region of reversal.

I have discovered that more favorable conditions of contact can be attained by motion of the sliding parts at a varying rate in the region of and near their middle positions. This region corresponds to the working profiles, where driving torque is transmitted, to profiles 34 and 41 and to profiles 37 and 46.

At and near the middle positions the rate of travel of a sliding part 32 should increase with increasing distance of the part from the cam axis as will further be shown.

Figure 2:
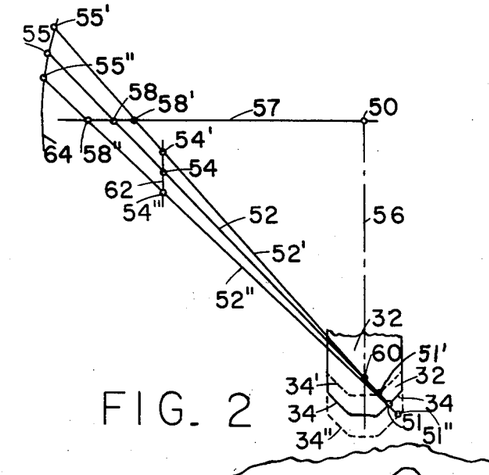
Figs. 2 and 3 are diagrams explanatory of the preferred profile curvatures used on the sliding parts and the cam members of this differential.
Figure 3:
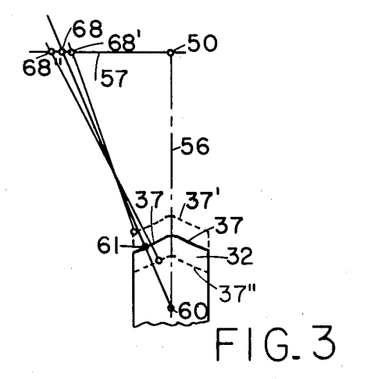

Fig. 2 shows a preferred form of contact for the sloped outside working profile 34 of a sliding part 32, while Fig. 3 refers to a preferred form of contact at the profile 37 adjacent the inner end of the sliding part. A mean position of the sliding part 32 is shown in full lines. 50 denotes the common axis of the cam members and of the cage member. Mathematically full surface contact between a sliding part and the cam engaged thereby is impossible with radial motion of the sliding part. However we can closely approach it. This is one of the objects of the invention.

In each considered position there will be a point of contact where the direction of the contacting profiles is exactly the same. 51 (Fig. 2) is a point of contact between a profile 34 and a profile 41 in a mean position of a sliding part 32. It is kept near the middle of the working profile 34. The contact normal 52 at point 51 contains the curvature center 54 of the profile 34, and the curvature center 55 of the cam profile 41 at the point of contact 51. 56 denotes a radius drawn through the center 50 in the direction of motion of the sliding part 32. 57 is a line drawn through the center 50 perpendicular to the radius 56.

Normal 52 intersects the line 57 at a point 58 which defines the instantaneous motion. As known, the linear velocity of the sliding part 32 is equal to the peripheral velocity of the cam 21 at the point 58, that is, at the radius 50—58. 58 is the instantaneous center of relative motion.

The largest useful duration of contact is attained when the point of contact moves toward the end of the sliding part 32 when the latter recedes into the cage 24. In Fig. 2 the sliding part 32 has receded into the cage in the dotted position of the profiles 34 indicated at 34'. The point of contact should then be at 51' near the outside end of the sliding part 32, since all other portions of the working profile are out of reach of the cam profiles 41. The internal cam 21, of course, reaches inwardly no further than the cage. In other words, as the profiles of the sliding block 32 move from the full line positions to the positions 34', the point of contact should move from 51 to 51'.

It can be demonstrated mathematically that this can be attained, together with intimacy of contact, by maintaining the curvature centers 54, 55 at opposite sides of the point 58 of the line 57. The following relationship should preferably be observed:

Let 60 denote the intersection of normal 52 with radius 56, and $p = 60$—$54$ = curvature radius of sliding part profile to point 60
$p_c = 60$—$55$ = curvature radius of cam profile to point 60
$p_1 = 60$—$58$ = curvature radius of logarithmic spiral to point 60

Then we have the relationship:

$$\frac{1}{p} + \frac{1}{p_c} = \frac{2}{p_1}$$

It should be noted that these curvature radii refer to a point 60 on radius 56, and represent the distances of the curvature centers from the point 60. The curvature radii to the profile point 51 is readily obtained from $p$, $p_c$ and $p_1$ by adding the distance 60—51.

The above equations also applies to the external cam (Fig. 3). Here the curvature radii at the profile point 61 are obtained from the curvature radii $p$, $p_c$ and $p_1$ by subtracting the distance 60—61.

In the two dotted positions 34', 34" of the working profiles of the sliding part 32, curvature center 54 has moved to positions 54', 54", respectively, on a straight line 62 parallel to the direction of travel of the sliding part 32. Likewise, curvature center 55 has moved to positions 55', 55", respectively, on a circle 64 concentric with the cam center 50. At infinitesimal displacements, or also with finite displacements in the case of circular arc profiles, distance 54'—55' is equal to the difference of the profile radii, and equal to 54—55 and to 54"—55". 54'—55' is the contact normal 52' in the inner position of the sliding block. It intersects the profile 34' at the point of contact 51' which is located as desired near the outer end of the sliding part. 51" on contact normal 54"—55" is the point of contact in the shown outer position of the sliding block.

Contact normal 52' intersects the line 57 at a point 58', the instantaneous center of relative motion. This point is displaced toward the turning center 50 as compared with the point 58. Radius 58'—50 is smaller than radius 58—50. The instantaneous linear velocity of the sliding part 32 is equal to the peripheral velocity of the cam 21 at point 58'. It is therefore smaller than in the mean position.

In the outer position of the sliding part 32, the instantaneous center of relative motion is at 58", at an increased distance from the turning center 50 of the cam 21. Accordingly, the instantaneous linear velocity of the sliding part 32 is here larger. On uniform rotation of the cam 21 the sliding part 32 increases its linear velocity with increasing distance from the cam axis 50.

For the contact between the sliding part 32 and the profile of the external cam 23 (Fig. 3), the same motion of the sliding block 32 should be attained. The two positions 34', 34" of the working profiles of the sliding part 32 are at the same distances from the mean position 34 as are the two positions 37', 37" (Fig. 2) from mean position 37. Accordingly the contacts of the sliding part 32 with the external cam 23 should result in the same instantaneous velocity of the sliding part as already determined for the internal cam 21.

As the two cams turn uniformly with respect to the cage member 24 at the inverse ratio of their numbers of lobes, the instantaneous center 68 (Fig. 3) at the mean position is at a shorter distance 50—68 from the turning center 50 than the instantaneous center 58 of Fig. 2 but is also located on line 57. These distances are in proportion to the number of lobes of the respective cams. This is to attain the same instantaneous velocity on the sliding part 32 when in contact with the external cam 23 as when in contact with the internal cam 21. Likewise, the instantaneous centers 68', 68" are at proportionally smaller distances from turning center 50 than instantaneous centers 58', 58", respectively. The whole array of points 50, 68', 68, 68" are a reduced picture of the array of points 50, 58', 58, 58", the reduction being in the ratio of the numbers of lobes of the respective cams.

Preferably I use circular arcuate profiles, at least with the internal cam 21. The working profiles 34, 41 are then circular arcs; and 54, 55 are the centers of these arcs.

By selecting both profile curvatures or both contacting profiles 34, 41, the relative motion is determined. It is also possible to start out with a given motion and one of the two contacting profiles, and then to determine the other mating profile.

In determining the mating profiles of the sliding parts 32 and the external cam 23, the given positions of the instantaneous centers have to be realized. One way to do this is to assume profile 37 as a circular arc whose center is well beyond point 68 in the middle position, and to determine the mating profile of the cam 23 from given profile 37 and from the given positions of the instantaneous centers of relative motion.

It should be understood that the above described determination of the mating profiles applies to all cam-type differentials, including those where the cage member is rigid with the drive gear.

The partial locking action

Figures 4, 5, 6:
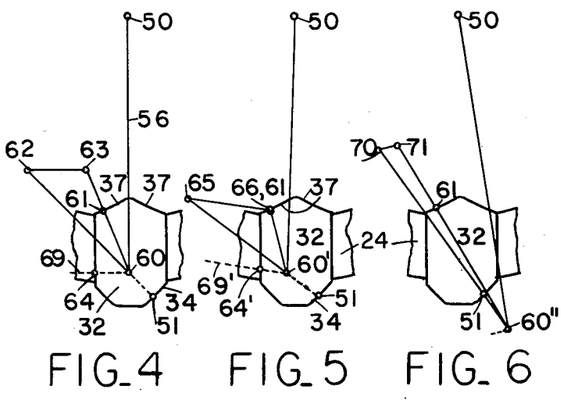
Figs. 4, 5 and 6 are diagrams illustrative of the forces acting on a sliding part in the embodiment of the invention shown in Fig. 1, Fig. 4 showing the forces at zero friction, and Figs. 5 and 6 showing the forces at a coefficient of friction of 0.15, the load being in the same direction in both Figs. 5 and 6, but the differentiation being in opposite directions.

Fig. 4 shows the forces exerted upon the sliding part 32 at its mean position, assuming zero friction. The forces or loads are then exactly perpendicular to the profiles 34 and 37. Thus the driving load applied at point 51 passes through point 60 and also through point 62. 60—62 represents the driving load, in direction as well as in amount. The load reaction of the external cam 23 is applied at point 61; and 63—60 represents this load, in direction as well as in amount. The reaction from the guideways 31 of the cage is perpendicular to the guideways and passes also through point 60, so that the three forces balance one another. It is applied at point 64. 62—63 represents this reaction in direction as well as in amount. Load determining procedures of this kind are well known in engineering.

The torques exerted on the cage member 24 and on the external cam member 23 at zero friction are proportional to the peripheral components of the forces passing through point 60. They are proportional to distance 62—63 and to the distance of point 63 from radius 56.

In the illustrated example the number of cam lobes are fourteen and six, respectively, making a difference of eight. The torque applied by the internal cam 21, and the torque received by the external cam 23 are in the proportion of the numbers of lobes, that is, of fourteen to six at zero friction. The torques exerted on the driven members at zero friction are in the proportion of six to eight.

Figs. 5 and 6 are similar to Fig. 4 but show the forces as they actually exist with friction. A friction coefficient of 0.15 has been assumed in Figs. 5 and 6. Fig. 5 refers to the case where the sliding part 32 is moving inwardly, that is, toward center 50 under the applied load. Fig. 6 refers to the case where the sliding part 32 moves outwardly under the applied load.

The force applied at point 51 in Fig. 5 is no longer perpendicular to the working profile 34 of the sliding part, but is slanted as shown. It is inclined to the profile normal at point 51 by the friction angle, the angle whose trigonometrical tangent equals the friction coefficient. The load reaction of the external cam 23 is still applied at point 61, but is also slanted to the profile normal as shown. The two forces intersect at 60' (Fig. 5). The reaction from the guideways of the cage is also slanted on account of the motion of sliding part 32. It passes through point 60' and extends along the dotted line 69', being applied at the point 64'.

60'—65 represents the driving load, in direction as well as in amount; 66—60' likewise represents the load reaction of the external cam 23; and 65—66 represents the load reaction of the cage 24. Point 66 happens to fall on the profile 37; but this is a coincidence.

The driving torque equals the product of radius 50—60' multiplied by the component of the force 60'—65 which is perpendicular to this radius. Inasmuch as all three forces pass through point 60', their torques are proportional to the force components perpendicular to radius 50—60'. On the driven members these components and the torques are found by scaling to be in the proportion of about four to one. The cage member receives, therefore, about four times as much torque as the external cam member, at the assumed direction of differentiation.

The results are reversed in Fig. 6 which refers to the outward motion of the sliding part 32 under load. The driving load is still applied at point 51, but is now slanted in the opposite direction to the profile normal. This is also true of the load reaction of the external cam applied at point 61. The two forces intersect at a point 60''. As this point is beyond the guide ways 33 of the sliding part, it takes reactions from both sides of the guide ways to maintain load balance. This increases the friction in the guide ways so that the load taken up by the guide ways has an increased slant.

60''—70, 71—60'', and 70—71 represent the driving load, the load reaction of the external cam, and the load reaction of the cage member, in direction as well as in amount. These three forces pass through point 60'', and their torques are proportional to the force components perpendicular to radius 50—60''. Scaling shows that the torques exerted on the driven members at differentiation in the assumed opposite direction are in the proportion of approximately four to one. Here the external cam member 23 receives the larger torque, a torque about four times the torque received by the cage member 24.

In other words, driving conditions of the two driven members 23, 24 are balanced on the whole. One does just about as much overall driving as the other. This balanced condition exists at lobe numbers of fourteen and six, where the number of lobes of the external cam member is less than half the number of lobes of the internal cam member. More broadly, when $p$ denotes the averaged torque desired on the external cam member 23 in proportion to the total torque applied to the internal cam member 21, then the number of lobes 45 of the external cam 23, in proportion to the number of lobes 40 of the internal cam 21, should be somewhat less than $p$. In this way, the desired average torque proportion of $p$ to be transmitted to the external cam member can be realized. The cage member then receives the remainder of the driving torque, that is, a torque proportion of $(1-p)$.

In Figs. 4, 5 and 6, the driving conditions have been illustrated for driving contact in one direction. For driving contact in the opposite direction symmetrical conditions prevail because the profiles themselves are symmetrical with respect to a central plane extending in the direction of motion of the sliding parts.

Figure 7:
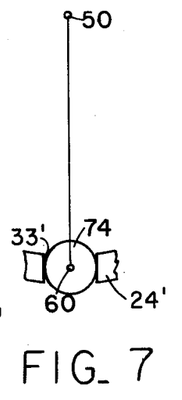
Fig. 7 is a diagram showing the use of a cylindrical pin or roller in place of a sliding part such as shown in Figs. 4 to 6.

Fig. 7 illustrates the condition where a pin or roller 74 is substituted for the sliding part 32. This pin or roller rolls reciprocatingly in guideways 33' of cage 24'. With zero friction the driving torque passes through point 60 corresponding to point 60 of Fig. 4.

Figures 8, 9, 10, 13:
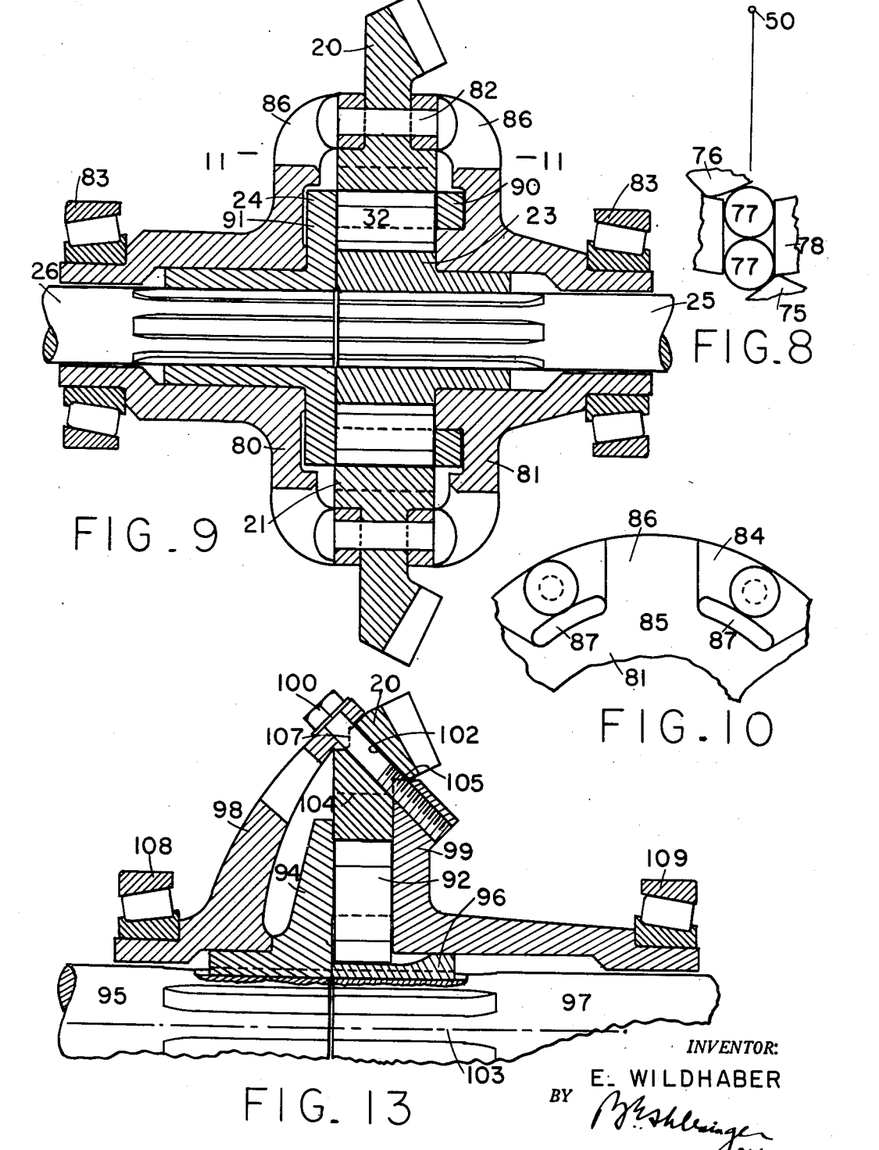
Fig. 8 is a diagram illustrating the use of two rollers in a differential constructed according to another embodiment of the present invention.
Fig. 9 is an axial section on a reduced scale of the differential shown in Fig. 1 and taken at right angles to Fig. 1.
Fig. 10 is a fragmentary axial view of one of the side members of the housing of the differential of Fig. 9.
Fig. 13 is a fragmentary axial section of the differential shown in Fig. 12 on a reduced scale.

Fig. 8 shows how the power may be transmitted from an internal cam 75 to an external cam 76 through a plurality of rollers 77, while also transmitting power to the cage member 78. Here the cam members and the cage member are all coaxial and centered at 50.

The general design

In the embodiment of the invention shown in Fig. 9, the two side members 80 and 81 of the differential housing are rigidly secured to the drive gear 20 by means of rivets 82. This is a tapered drive gear such as is commonly used on passenger cars and many trucks. The rivets 82 form a very simple and rugged connection between the drive gear and the differential housing, and may be used in quantity production. Since the internal cam 21 is formed integral with the drive gear, the power flow does not have to pass through any connections. The rivets do not have to transmit torque, and are not stressed in shear. In the rare cases where failure occurs in the drive gear or the differential, the whole unit will have to be replaced; but in quantity production this is hardly more expensive than trying to replace an individual broken part.

The side members 80, 81 and drive gear 20 together form the rotary differential housing. It is mounted in two anti-friction bearings 83 held by the side members 80, 81.

Figures 11, 14:
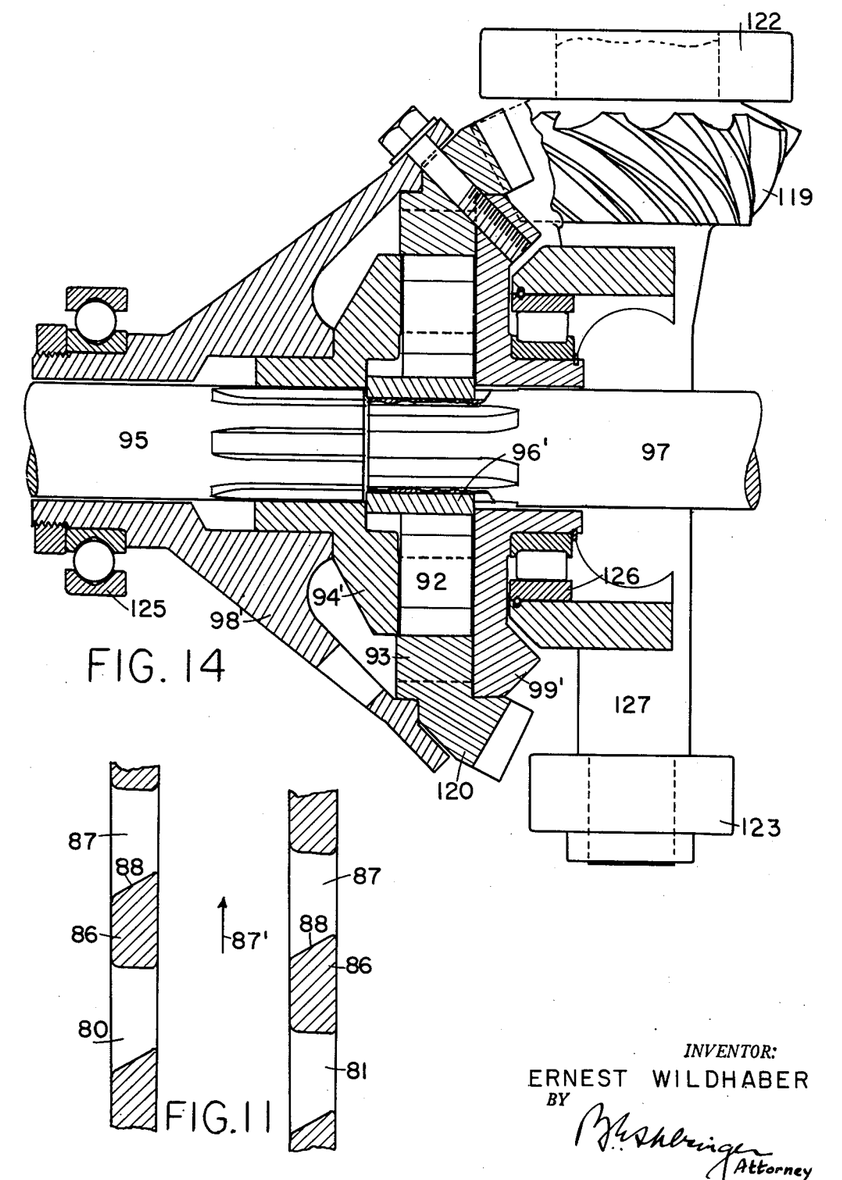
Fig. 11 is a fragmentary cylindrical section of the two opposite side members of the differential housing shown in Fig. 9, the cylindrical section being taken along the line 11—11 of Fig. 9 looking from the outside of the housing inwardly, and being developed or rolled out into a plane.
Fig. 14 is an axial section showing a differential constructed according to the present invention, and showing how my differential lends itself to a novel drive arrangement for an automotive rear axle.

A partial end view of side member 81 is shown in Fig. 10; and a partial peripheral section of the two side members is shown in Fig. 11. Each side member comprises a ring-shaped flange 84 connected with the body portion 85 of the side member by arms or spokes 86. Openings or spaces 87 are provided between the spokes to permit flow of lubricant between the outside and the inside of the rotary differential housing. To help such flow, I may shape the arms 86 as indicated in Fig. 11, in which the arrow 87' denotes the direction of forward motion. The forward sides 88 of the spokes are sloped as indicated so that the turning motion of the rotary differential housing tends to draw in lubricant on one side and out on the other side. In other words, the arms 86 act like partial screws or propellers. The differential and its housing, of course, are enclosed in the axle housing itself (not shown) which may be of conventional structure.

The openings 30, in which the blocks 32 slide, are of rectangular shape, preferably with rounded corners. They are closed at the both ends axially of the cage, being closed at one end by the main flange portion 91 of the cage and at their opposite ends by the integral parallel flange portion 90. This closed construction adds to the strength of the cage. The holes 30 can be finished by broaching. Likewise the internal cam lobes 40 can be broached, as the cam 21 is open at both ends. The external cam lobes 45 can also be broached, or can be produced by hobbing, milling, or planing.

Figure 12:
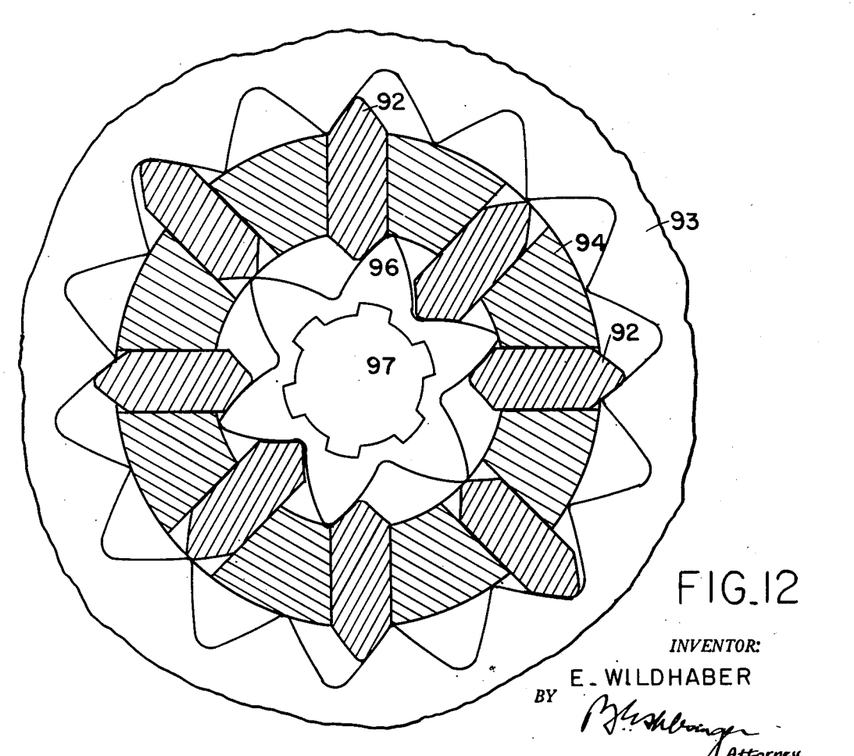
Fig. 12 is a part cross-section, part view, similar to Fig. 1, but of a somewhat modified embodiment of the invention.

The embodiment of Fig. 12 differs from that of Fig. 1 in that the sliding parts 92 are narrower and longer than the parts 32. The parts 92 have a length at least twice their width. Hence, whereas the mean normals to the outer and inner profiles in the case of the embodiment shown in Fig. 1 intersect in a common point 60, the mean normals to the outer working profiles in the case of the embodiment of Fig. 12 intersect at a point disposed radially outside the intersection point of the mean normals of the inner working profiles. This is because in the embodiment of Fig. 12 the sliding parts 92 have greater length radially than the sliding parts 32 of Fig. 1. Otherwise it is similar to the embodiment of Figs. 1 to 9 as regards operation. It comprises an internal cam member 93 formed integral with the drive gear 20 (Fig. 13) which transmits the whole power passing through the differential, a cage member 94 splined to an axle shaft 95, and movably holding parts 92, and an external cam member 96 splined to an axle shaft 97. The cage member 94 and the external cam member 96 receive the divided power as in the previously described embodiment of this invention. The cam members and cage member are all coaxial.

The openings in the cage member, which guide the sliding parts 92 for radial motion, are shown here in the form of slots. They are open at one end, at the right hand end in Fig. 13. If desired, such slots could also be used in the first described embodiment, and vice versa.

Two side members 98 and 99 of different diameters, respectively, are rigidly secured to the drive gear 20 and internal cam member by screw bolts 100 that thread into the side member 99. They pass through holes 102 provided in the drive gear 20. These holes are inclined to the axis 103 of the drive gear and lie on a conical surface. Through this provision it is possible to use a differential of comparatively large diameter. The root surface of the cam lobes of the internal cam may have a diameter as large as indicated by the dotted line 104. It may even reach into the screw bolts, as shown, by aligning the screw bolts with the lobes of the internal cam, and using a number of screw bolts contained in the number of lobes. Thus on a cam with fourteen lobes I may use seven screw bolts.

The side members 98 and 99 contain cylindrical surfaces 105 and are centered on corresponding cylindrical surfaces of the drive gear. They also contain plane surfaces 107 of ring shape which match and seat against corresponding plane surfaces on the drive gear. The side members 98 and 99 carry bearings 108, 109 for mounting the rotary differential housing composed of the side members and the drive gear.

It has already been shown that the number of lobes of the external cam member should be somewhat less than half the number of lobes of the internal cam member to transmit the same averaged torques to the two driven shafts. Thus, in the illustrated examples, these numbers are six and fourteen. A still more important effect results from such a provision. Various sliding parts have different phases. If the lobe numbers were six and twelve there would be no phase difference. It would then be necessary to provide a plurality of rows of sliding parts. This would complicate the differential and make it more costly, also wider.

The different phases are readily seen in Figs. 1 and 12. In each relative position of the cams there are some sliding parts in a position to transmit torque. Preferably I keep the lobe numbers even numbers so that diametrically opposite parts are in the same phase. Equal forces are then applied at two diametrically opposite points, giving pure moments or torques.

The maximum number of sliding parts (32 or 92) which can be used in my cam type differential can be shown to be equal to the difference of the number of cam lobes on the two cams.

The differential of Fig. 13 has a comparatively large diameter so that its loads are moderate. It can be kept narrow and compact. Its cost is low. This applies also to the other embodiments. The sliding parts can be cut off from bar stock finished for instance by cold drawing, or cold rolling. No gear cutting operations are required on them.

The narrow width of this differential opens up new design possibilities. Fig. 14 illustrates such a new design embodiment as applied to the rear axle of a passenger car or truck. In this embodiment the final drive is a hypoid drive consisting of a hypoid pinion 119 and a hypoid drive gear 120. The latter is formed integral with the internal cam member 93 of a gearless differential as described with reference to Fig. 13. A cage member 94' and an external cam member 96' receive the divided power through the sliding parts 92, and are splined to the axle shafts 95 and 97.

On passenger cars and many trucks, the conventional mounting of the hypoid pinions is the over-hung mounting, that is, the pinion is mounted on two bearings both disposed back of the pinion. This requires a carrier which stands out from the axle on the driving side.

A more compact axle is attainable with the present invention, for the pinion 119 may be mounted, as shown, between two bearings 122, 123, disposed on opposite sides of the gear axis, the axis of the axle shafts 95, 97. This disposition also provides a better and more rigid mounting for the pinion.

The differential, that is, the rotary differential housing made up of gear 120 and side members 98', 99' rigidly secured thereto is mounted in two bearings 125, 126. These are disposed on the same side of the axis of shaft 127 and of the pinion 119, but on opposite sides of the hypoid gear 120. Bearing 126 is preferably a cylindrical roller bearing. The other bearing 125 is adapted to take axial thrust in both directions, as well as radial loads. The gear 120 can be adjusted along its axis by merely adjusting bearing 125. In such adjustment, the cylindrical rollers of bearing 126 slide laterally on their outer races.

With the described arrangement, the pinion shaft 127 has to by-pass only the axle shaft 97, and no part of the rotary differential housing. The shaft offset needs only to be slightly larger than the sum of the shaft radii, and no excessive offset is needed. The projecting pinion shaft may be formed integral with the hypoid pinion 119 as shown or, if desired, the shaft and pinion may be made in two parts which are then rigidly secured together.

In the described embodiments I have shown cam lobes with comparatively large slope to the peripheral direction, to attain moderate loads. However, other slopes can also be found. Smaller slopes result in increased loads at the cams and increased friction, that is, increased braking of the relative motion at differentiation. Completely locking differentials may be achieved, if desired, by sufficiently reducing the cam slopes. In such differentials the drive around a curve is on the inner wheel only, the outer wheel over-running the inner wheel.

With the present invention, the internal cam member can be made larger than heretofore possible because it is now rigid with the outermost part of the differential, that is, rigid with the rotary differential housing. Heretofore, the internal cam member had to be inside the rotary differential housing, and movable relative to the housing. With the differential of the present invention, moreover, the internal cam member can be made integral with the drive gear and can be open at both ends so that it can be made with more productive processes than has heretofore been possible in making such members, as, for instance, broaching. The present differential also lends itself well to the use of a single row of sliding parts, and does not require multiple rows. Furthermore, the rotary differential housing can be made up of the drive gear with its integral internal cam member, and of two side members rigidly secured to the drive gear, whereby the connection between each side member and the drive gear transmits no torque and is free of shear stress. Last, but not least, the differential of the present invention can be produced at low cost.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. A gearless differential comprising two coaxial cam members, a cage member coaxial with said cam members, and a plurality of movable parts held by said cage member and each engaging both of said cam members, one of said cam members being the driver and transmitting the whole power passing through the differential, and the other two coaxial members being each connected to a shaft to transmit thereto part of the power.

2. A gearless differential comprising an internal cam member and an external cam member coaxial therewith, a cage member coaxial with said cam members, a plurality of parts movably held by said cage member and each engaging both of said cam members, and a drive gear, said internal cam member being rigid with said drive gear and transmitting from said drive gear the whole power passing through the differential, the other two coaxial members being each connected with a shaft to transmit thereto part of the power.

3. A gearless differential comprising an internal cam member and an external cam member coaxial therewith, a cage member coaxial with said cam members, a plurality of parts movably held by said cage member in radial openings thereof, each of said parts engaging at its opposite ends, respectively, with both of said cam members, and a drive gear, said internal cam member being rigid with said drive gear and transmitting from said drive gear the whole power passing through the differential, the other two coaxial members being each connected with a shaft to transmit thereto part of the power.

4. A gearless differential comprising two coaxial cam members, one of said cam members being larger than the other, a drive gear, the larger cam member being integral with said drive gear and transmitting from said drive gear the whole power passing through the differential, two side members rigidly secured to said larger cam member at opposite sides thereof, a bearing carried by each of said side members for rotatably mounting the differential, a cage member coaxial with said cam members and mounted between said cam members, a plurality of parts movably held by said cage member and each engaging both of said cam members, said cage member and the smaller cam member being each connected with a shaft to transmit power to said shafts.

5. A gearless differential comprising two coaxial cam members, each having a plurality of lobes, one of said cam members being larger than the other and having more lobes, a drive gear, said larger cam member being formed integral with said drive gear and transmitting the whole power passing through said differential, said larger cam member having a plurality of angularly-spaced holes therethrough which are inclined to the axis of said larger cam member and equally spaced about said axis, two side members of unequal diameters, means extending through said holes for securing said side members to said larger cam member, a bearing carried by each of said side members for rotatably mounting the differential, a cage member coaxial with said cam members, and a plurality of parts movably held by said cage member, each of said parts engaging both of said cam members, and both said cage member and the smaller cam member being each connected to a shaft to transmit power to said shafts.

6. An automotive differential comprising a tapered drive gear, an internal member formed integral with said drive gear and transmitting the whole power passing through said differential, said internal member having a plurality of holes inclined to the axis of said drive gear and equally spaced about said axis, two side members whose maximum outside diameters are unequal, means extending through said holes for rigidly securing said side members to said internal member, a bearing carried by each of said side members for rotatably mounting the differential, two shafts mounted coaxially with said drive gear, and means connected with said internal member for dividing the power transmitted through said internal member between said two shafts, whereby said two shafts may turn relatively to one another.

7. A gearless differential comprising two coaxial multi-lobed cam members, a cage member coaxial with said cam members, and a plurality of parts movable in said cage member and each engaging both of said cam members, a pair of driven elements, one of said cam members being the driver and transmitting the whole power passing through the differential, the other cam member and said cage member each being connected to one of said driven elements and each transmitting part of the power, and said one cam member having more than twice as many lobes as said other cam member.

8. A gearless differential comprising two coaxial multi-lobed cam members, a cage member coaxial with said cam members, and a plurality of parts movable in said cage member and each engaging both of said cam members, a pair of driven elements, one of said cam members being the driver and transmitting the whole power passing through the differential, the other cam member and said cage member each being connected to one of said driven elements and each transmitting part of the power, said one cam member having more lobes than the other cam member, and the number of said movable parts being equal to the difference in number of the lobes of the two cam members.

9. A gearless differential comprising two coaxial multi-lobed cam members, a cage member coaxial with said cam members, and a plurality of parts movable in said cage member and each engaging both of said cam members, a pair of driven elements, one of said cam members being the driver and transmitting the whole power passing through the differential, the other cam member and said cage member each being connected to one of said driven elements and each transmitting part of the power, said one cam member having more lobes than the other cam member, the number of lobes on each cam member being even, and the number of said movable parts being equal to the difference in number of the lobes of the two cam members.

10. A gearless differential comprising an internal cam member, an external cam member, and a cage member, said members being coaxial, and a plurality of sliding parts radially movable in said cage member, each of said sliding parts engaging both cam members, the working profile of a cam member and the mating working profile of a sliding part having opposite curvature, one of said working profiles being concave and the other being convex, the curvature centers of said working profiles at a mean point of contact lying at opposite sides of a radius perpendicular to the direction of radial movement of each sliding part, said radius passing through the axis of said members.

11. A gearless differential comprising an internal cam member, an external cam member, a cage member, said members being coaxial, a plurality of sliding parts radially movable in said cage member and each engaging both cam members, each of said cam members having a plurality of lobes whose total profiles are made up of working profiles adapted to transmit torque and of connecting portions, the working profiles of the internal cam member and the mating working profiles of the sliding parts being circular arcs, and the centers of said arcs at a mean point of contact lying at opposite sides of a radius drawn through the axis of said members perpendicular to the direction of travel of each sliding part.

12. A gearless differential comprising a multilobed internal cam member, a multilobed external cam member, a cage member, said members being coaxial, a plurality of sliding parts mounted in said cage member for movement radially of the common axis of said members, each of said sliding parts having a pair of oppositely inclined working profiles at both its outer and its inner ends which engage said two cam members, the pair of working profiles at the outer end of each sliding part being separated by a portion extending in the peripheral direction of said cam members, and the working profiles of the lobes of said external member being separated at their roots by peripherally-extending dwell portions.

13. A gearless differential comprising a multilobed internal cam member disposed to receive the whole driving power, a multilobed external cam member, a cage member, all said members being coaxial, said external member and said cage member being connected respectively, with coaxial driven elements, and a plurality of sliding parts mounted in said cage member for movement radially of the common axis of said members, each of said sliding parts having a pair of oppositely sloped working profiles at its outer end and at its inner end, which engage the two cam members, the mean normals to the outer working profiles intersecting each other at the same point at which the mean normals of the inner working profiles intersect.

14. A gearless differential comprising a multilobed internal cam member disposed to receive the whole driving power, a multilobed external cam member, a cage member, all said members being coaxial, said external member and said cage member being connected, respectively, with coaxial driven elements, and a plurality of radial guide openings provided in said cage member, the number of said openings being equal to the difference in number of the lobes provided on said cam members, and means movable in said openings and engaging both cam members.

15. A gearless differential comprising a multilobed internal cam member disposed to receive the whole driving power, a multilobed external cam member, a cage member, said three members being coaxial, said external cam member and said cage member being connected, respectively, with coaxial driven elements, a plurality of sliding parts mounted in said cage member for movement radially of the common axis of said members, each of said sliding parts having a pair of oppositely inclined working profiles at its outer and its inner ends which engage the two cam members, the ends of each sliding part being so spaced from each other that the mean normals of the outer working profiles intersect at a point disposed radially outward of the point of intersection of the mean normals of the inner working profiles.

16. A gearless differential comprising an internal cam member, an external cam member, a cage member, all said members being coaxial, two driven elements, one of said members being the driver, and the two other members being each connected with a driven element, a plurality of parts slidable in said cage member radially of the common axis of said members and engaging said cam members, each of said cam members having a plurality of lobes whose total profiles are made up of working profiles adapted to transmit torque and of connecting portions, said sliding parts having working profiles adapted to mate with working profiles of said cam members, a working profile of the internal cam member and the mating working profile of a sliding part being concave and convex, respectively, a working profile of the external cam member and the mating working profile of the sliding part being convex and concave, respectively, the average curvature of each pair of mating contacting working profiles being approximately equal to the curvature of an arc contacting them and centered on a radius drawn through said common axis at right angles to the direction of motion of the sliding part, the curvatures of the contacting profiles of each pair of mating profiles differing so that uniform rotation of the cam members causes a sliding part to move in a stationary cage member at a rate that increases with increasing distance of said part from the axis of the members.

17. A gearless differential comprising a multilobed internal cam member rigid with a driving element, a multilobed external cam member with fewer lobes than said internal cam member, a cage member, said members being coaxial, two driven elements, said external cam member and said cage member being each connected with one of said driven elements, a plurality of sliding parts mounted in said cage member for movement radially of the common axis of said members, each of said sliding parts having a pair of opposite working profiles at its outer and inner ends respectively, which engage the two cam members, the outer working profiles comprising two convex circular arcs that are inclined to each other and that are joined by a connecting portion, the inner working profiles comprising two concave circular arcs that are inclined to each other and that are joined by a convex connecting portion, the lobes of said cam members also being composed of working profiles and connecting portions, said working profiles carrying the main load and occupying more radial depth than said connecting portions, each working profile of said internal cam member being a single concave circular arc, and each working profile of said external cam member being a single convex circular arc.

References Cited in the file of this patent

UNITED STATES PATENTS

| | | |
|---|---|---|
| 1,336,950 | Ford | Apr. 13, 1920 |
| 1,770,314 | Lancia | July 8, 1930 |
| 1,776,677 | Brewer | Sept. 23, 1930 |

(Other references on following page)

UNITED STATES PATENTS

| | | |
|---|---|---|
| 1,836,684 | Robbins | Dec. 15, 1931 |
| 1,857,978 | Robbins | May 10, 1932 |
| 2,142,575 | Spicacci | Jan. 3, 1939 |
| 2,345,846 | Wemp | Apr. 4, 1944 |
| 2,369,075 | Robbins | Feb. 6, 1945 |
| 2,391,350 | Schmidt | Dec. 18, 1945 |
| 2,560,779 | Robbins | July 17, 1951 |
| 2,655,053 | Patch | Oct. 13, 1953 |
| 2,700,310 | Viebrock | Jan. 25, 1955 |

FOREIGN PATENTS

| | | |
|---|---|---|
| 474,560 | Great Britain | Nov. 3, 1937 |